M. A. HANNON.
CORNER BEAD.
APPLICATION FILED JAN. 23, 1909.
923,430.
Patented June 1, 1909.
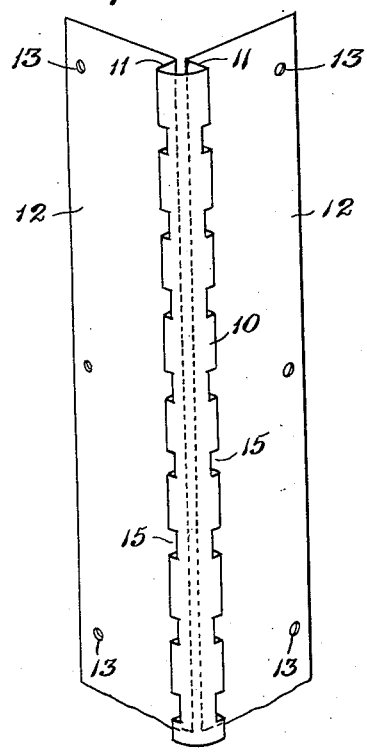
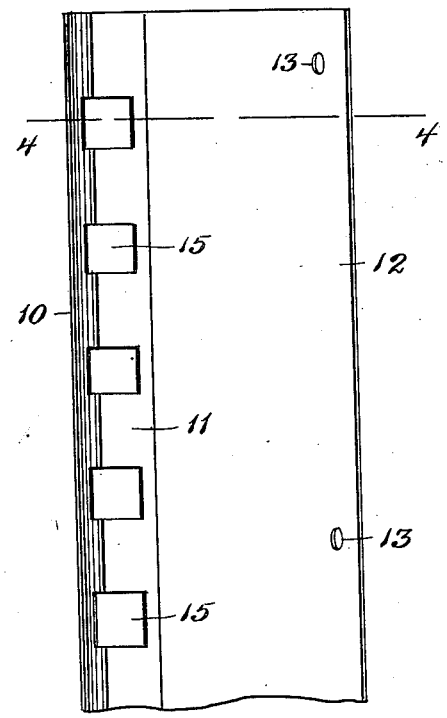
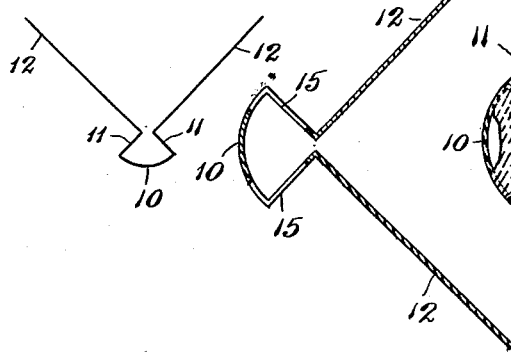
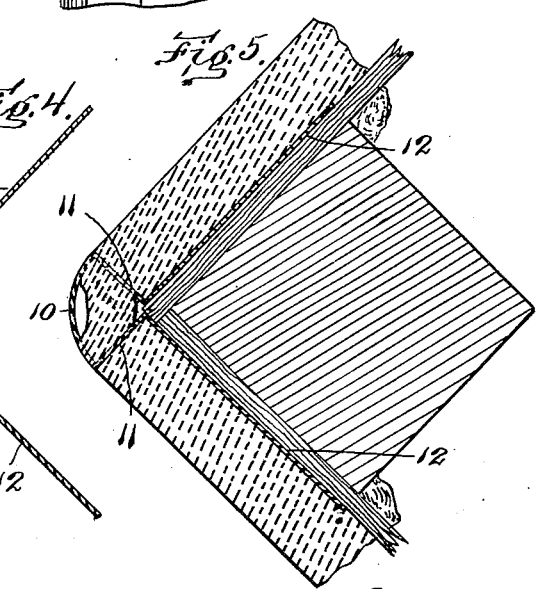
Witnesses.
F. R. Roulstone
P. H. Pezzetti
Inventor.
M. A. Hannon
by Wright Brown Quinby May

UNITED STATES PATENT OFFICE.

MICHAEL A. HANNON, OF BOSTON, MASSACHUSETTS.

CORNER-BEAD.

No. 923,430.

Specification of Letters Patent.

Patented June 1, 1909.

Application filed January 23, 1909. Serial No. 473,885.

*To all whom it may concern:*

Be it known that I, MICHAEL A. HANNON, of Boston, in the county of Suffolk and State of Massachusetts, have invented certain new and useful Improvements in Corner-Beads, of which the following is a specification.

This invention has relation to corner beads for plastering, and its object is to form a single strip of sheet metal into a corner bead characterized by having a curved or bulging bead portion, wing portions for attaching, intermediate web portions, and perforations which include the bead and web portions and which facilitate the introduction of plaster into the interior of the bead portion. Ample connection of the body of plaster on one side of the bead with that on the other side is thus made possible, and the two may readily be merged and interlocked with the metal bead.

Of the accompanying drawings, which illustrate one form in which the invention may be embodied,—Figure 1 represents a perspective view of a metal corner bead. Fig. 2 represents an elevation thereof. Fig. 3 represents a top edge view. Fig. 4 represents a section on the line 4—4 of Fig. 2. Fig. 5 represents a section of a corner to which the bead is attached.

The same reference characters indicate the same parts wherever they occur.

The invention is embodied in a sheet metal strip of which the central longitudinal portion is curved so as to form a bulging bead portion 10. When adapted for use on a ninety degree corner, the bead portion is preferably a quadrant, as shown. From the edges of the bead portion, the metal is bent inwardly so as to form converging webs 11. From the inner extremities of the web portions, the metal is bent outwardly so as to form attaching wings 12. The wings may be provided with perforations 13 and fastened by nails driven therethrough.

In order to provide for the interlocking of the plastering 14, the web portions are provided with perforations 15 of ample size and any desired shape, but which include also the marginal portions of the bead. By reason of extending the perforations partly into the bead portion, the interior surface thereof serves to oppose any outward tendency of the plaster, and the plaster when applied may be very readily worked into that portion of the strip.

I claim:

1. A corner bead composed of a strip formed with a bead portion, wing portions, web portions connecting the wing portions with the bead portion, and perforations each embracing a web portion and a part of the bead portion.

2. A corner bead composed of a strip formed with a curved bead portion, wing portions, web portions connecting the wing portions with the bead portion, and perforations each formed by removing a part of an adjoining web and bead portion.

3. A corner bead composed of a strip formed with a bead portion of quadrant shaped cross section, converging webs extending from the extremities of the quadrant, diverging wings extending from the inner extremities of the webs, and a series of perforations in each web, each perforation including a portion of the quadrant.

4. A corner bead composed of a strip formed with attaching wings, a web extending from each wing, an outwardly bulging bead portion connecting the outer extremities of the webs, and a series of perforations in the juncture of each web and the bead portion, each perforation forming an indentation in the marginal portion of the bead.

In testimony whereof I have affixed my signature, in presence of two witnesses.

MICHAEL A. HANNON.

Witnesses:
E. BATCHELDER,
PETER W. PEZZETTI.